Oct. 2, 1934.                R. JOHN                 1,975,424
                           AIR ACTIVATOR
                      Original Filed Jan. 6, 1932

Inventor
Robert John

By
Bacon & Thomas
Attorneys

Patented Oct. 2, 1934

1,975,424

UNITED STATES PATENT OFFICE 1,975,424

AIR ACTIVATOR

Robert John, New York, N. Y.

Application January 6, 1932, Serial No. 585,101
Renewed November 16, 1933

13 Claims. (Cl. 204—32)

This invention relates to improvements in ozonizers of the silent electrical discharge type, and particularly to ozonizers suitable for household use, whereby sufficient quantities of ozone to have a bactericidal and deodorant effect may be diffused throughout the air of sleeping, living and dining rooms, bathrooms, closets, kitchens, etc., as distinguished from ozonizers intended to produce highly concentrated ozonization.

The invention has, among its objects, the production of a low percentage of diffused ozone in atmosphere at the minimum of cost and the maximum of simplicity, and to provide an automatic, economical means, not only of supplying the deficiency of ozone which usually exists in the atmosphere of city air, but also to provide a process of ozonization useful in special processes, as the manufacture of ozone in refrigerators or in the intake manifold of an internal combustion engine, and in many other situations in which compactness, cheapness and high efficiency are requisite; a still further object of the invention is to provide a means for producing ozone which shall be as free as possible from nitric acid and other oxidation products of air.

In the ozonizers of the present art, suitable for such purposes as are accomplished by the present invention, the well known Siemens ozonizer is commonly regarded as the simplest and most efficient type. This ozonizer, as is well known, consists of two concentric glass tubes, one or two feet in length, the outer covered and the inner lined with tinfoil, which act as electrodes for a silent discharge passed through the stream of air flowing between them; a typical electrical current for producing this result being one of, say, 10,000 volts, and 1 milliampere. By attaching a blower, air may be passed through the space between the concentric tubes and emerges with a measurable ozone content.

The production of pure ozone (irrespective of concentration) depends, first—on the character of the electric discharge and, second, on getting the newly created ozone molecule out of the path of further electrical disturbance. The ideal electrical condition is one in which the air is subjected to a silent luminous discharge, free from sparking, brush discharge, and, particularly what is known as edge discharge. When an even layer of luminous discharge is apparent, practically nothing is formed excepting ozone, if the treated air be immediately removed. Retreatment under these circumstances, however, will produce quantities of oxides of nitrogen. But if edge discharge or sparking is present, oxides of nitrogen are formed instantaneously, so that removal of the treated air is of no avail. In order to present the ideal, evenly luminous discharge, it is necessary to position the electrodes in such a way that the impinging electrons strike a relatively broad surface, free from points, corners and edges and preferably strike said surface at an angle less than or greater than 90 degrees. The reason for this latter is the well known fact that the ionization of air influences its conductivity as is evidenced by the traveling backward and forward of the electrical spark. The purpose of providing a surface which may be impinged at an angle is to prevent the piling up of discharge spots or foci on the electrode.

Accordingly, a feature of my invention resides in the production of ozone on a relatively smooth surface in the open air in such a way that the ozonized oxygen, through heat and the electrical breeze created, is instantly taken out of the field of electrification, such removal being effected at right angles to the field rather than across it, and the removal of the treated air causing a reduced pressure at the electrified surface by reasons of which new, untreated air comes into contact with the electrical discharge.

Also, as a further feature of the invention, the construction and design of my ozonizing element are characterized by freedom from arcing and edge or point discharge, the result being an even, luminous field of discharge, free from foci capable of forming deleterious oxides. This is made possible by constructing the ozonizing element so that the discharge takes place from the upper surface of one electrode to the corresponding upper surface of the other electrode.

As a still further feature of the invention, in order that the latter may take a form best suited for household use, I provide a compact unitary device, not substantially larger than an ordinary electric light bulb, which comprises a casing containing a conventional transformer for converting the electricity of the household circuit to the requisite voltage and amperage for operation of the ozonizer, the ozonizing element of my invention being mounted on one side of the casing and there being a plug projecting through another side of the casing adapted to be fitted directly into an electric light socket.

Briefly stated, my ozonizing element, in place of the two concentric tubes with their inner and outer linings of the Siemens ozonizer, comprises a smooth and regular di-electric plate or surface having surface electrodes fixed to the opposite faces thereof. The inner electrode is mounted in the center of the di-electric plate, preferably as by cementing, and is so proportioned with relation to the plate that the space between its periphery and the periphery of the plate is greater than the length of spark capable of being formed in open air by the source of electricity employed. The outer surface conductor or electrode on the opposite side of the plate is also preferably cemented to the plate, and is so shaped and designed as to produce the largest possible area of luminous silent discharge. As distinguished from prior known ozonizers, the electrodes of my invention, being fixed to the di-electric member, form no intervening air space through which the electrical discharge must travel and in which the generated ozone becomes trapped. As a consequence, the ozone produced by my ozonizing element is not subject to retreatment with the resultant production of deleterious oxides of nitrogen, but on the contrary, the generated ozone is immediately and automatically diffused into the open air surrounding the field of electrification and is also immediately and automatically replaced by untreated air from the surrounding atmosphere to be subjected to ozonification.

The di-electric surface or plate may be made of glass, mica, or the like, while the electrodes or conductors are preferably in the form of metal foil, such as tinfoil, aluminum foil, or similar electrical thin conductive material capable of exposing a broad surface. In order that there may be no sparking, brush discharge or edge discharge, which instantly produce nitrogen oxides, the edges of the electrode on the electrified surface of the di-electric are, as a feature of my invention, covered with a di-electric material whereby the electrical discharges, instead of concentrating at the edges of the electrode, strike the central portions of the electrode over a substantial area and at an angle other than normal with the result that there is no piling up of discharge spots on the electrode.

In a specific embodiment of my ozonizing element, herein chosen for illustration, I have employed as the di-electric plate or surface, an ordinary glass watch crystal and tinfoil, cemented to the opposite faces of the crystal, as the inner and outer conductors. The ozonizing element will be hereinafter described with reference to this specific embodiment, but the invention is not to be construed as limited thereto as various changes and modifications may be made therein without departing from the spirit and scope of my invention as defined in the appended claims.

For a more detailed understanding of the invention, reference will be had to the accompanying drawing, wherein.

Figure 1:
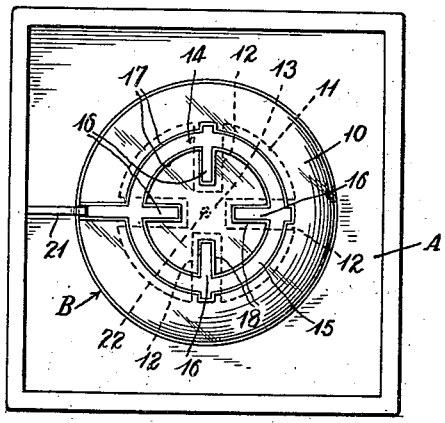
Figure 1 is a plan view of my ozonizing device and showing the outer surface or portion of the ozonizing element.

Referring more particularly to the drawing, the complete ozonizing device of my invention comprises a transformer casing A containing a suitable electrical transformer of known construction, the ozonizing element B secured to the upper portion of the casing, and the electrical plug or connection C projecting through the lower portion of the casing.

Describing first the ozonizing element B of the present invention, I employ an ordinary glass watch crystal 10 as the di-electric member or plate. An inner tinfoil electrode 11 of substantial area is cemented to the inner face of crystal 10. The electrode or surface conductor 11 is preferably secured to the central portion of the inner face of plate 10, and is substantially concentric with the latter. The space between the peripheries of di-electric 10 and electrode 11 is greater than the length of spark capable of being formed in open air by the source of electricity employed. Inner electrode 11 is provided with the radial cut-out portions 12, for a purpose hereinafter described, these cut-out portions terminating short of the center of the circular electrode to form the substantially square-contacting section 13 at the center of the electrode. The inner electrode thus takes the form of four quadrants integral with the central section 13.

Another electrode or surface conductor 14 of tinfoil is cemented to the outer face of crystal 10 and is so shaped and designed that a portion or portions thereof shall be out of alignment with a portion or portions of the inner electrode 11, for a purpose hereinafter described. It is desirable that outer electrode 14 produce the largest possible area of even luminous silent discharge and for this purpose, in the embodiment of the invention herein chosen for illustration, I have shown the outer electrode in the form of an annular ring 15 and the radial bars 16. As shown, the ring 15 is of smaller diameter than inner electrode 11, while the bars 16 are positioned directly above and of smaller length and breadth than the cut-out portions 12 of electrode 11 on the opposite face of the crystal. This design of the outer electrode and its relationship to the inner electrode yield a maximum area of even luminous silent discharge and enable substantial portions of both electrodes to be out of alignment. In the drawing I have shown the ring 15 and bars 16 as integral, but it will, of course, be understood that these may be made of separate pieces of metal foil.

In order to eliminate points and edges on the outer electrode where sparking and edge discharge might otherwise take place, I paint all edges of ring 15 and bars 16 with a di-electric cement such as bakelite varnish, or the like. In Fig. 1 of the drawing, this di-electric coating for both edges of ring 15 is shown at 17, while in the case of bars 16, the di-electric coating for the edges is shown at 18. All edges of the outer electrode being covered with di-electric, the outer face of the ozonizing element provides a relatively smooth and regular surface for electrification and is characterized by freedom from arcing and edge or point discharge, the result being an even luminous field of discharge, free of foci capable of forming deleterious oxides. In securing electrodes 11 and 14 to di-electric plate 10, a di-electric cement is also preferably employed.

From the construction thus far described, it will be observed that, the electrodes having been connected to a suitable source of electricity, the production of ozone takes place on the relatively smooth outer face of the ozonizing element exposed to the open air in such a way that the ozonized oxygen is instantly dissipated from the field of electrification through the heat and electrical breeze created. This removal of ozone takes place upwardly from or at right angles to the field of electrification rather than across the latter whereby there can be no retreatment of the generated ozone with the resultant production of deleterious oxides. This removal of the treated air creates a reduced pressure zone adjacent the outer surface of the ozonizing element by reason of which new, untreated air automatically comes into contact with the electrical discharge. Since the electrodes are cemented to opposite faces of the di-electric plate, there is no air space therebetween in which the generated ozone might be re-subjected to electrical discharge and thus converted into nitrogen oxides. Instead the discharge takes place from electrode 11 through di-electric plate 10, outwardly from the surface of the latter into the surrounding air and thence downwardly onto the outer surface of electrode 14. In other words, the discharge occurs from the upper surface of electrode 11 to the coresponding upper surface of electrode 14, passing through the di-electric plate and the surrounding atmosphere in its travel. As indicated by the arrows in Fig. 2, the discharge, upon leaving glass plate 10, jumps over the di-electric cemented edges 17 and 18 of electrode 14, and strikes the surface portions of the latter at an angle rather than perpendicularly. In this way, instead of concentrating at the edges of the electrode to produce sparking, the discharge spreads over the entire surface area of the outer electrode to produce the ideal evenly luminous discharge essential for perfect ozonization.

As already explained, the impingement of the discharges over a broad surface on the outer electrode at an angle other than normal, prevents the piling up of discharge spots on the electrode, thus eliminating foci capable of forming deleterious oxides.

The provision of the cut-out portions 12 in the inner electrode and the bars 16 of the outer electrode directly thereabove, affords a maximum area of unaligned portions of both electrodes whereby there is minimum discharge directly from the upper face of the inner electrode to the under face of the outer electrode. On the contrary, by reason of the disalignment of substantial portions of both electrodes, there is maximum discharge from the upper surface of the inner electrode onto the corresponding upper surface of the outer electrode through the surrounding air. The ozonizing character of the electric field is further augmented by making the inner electrode of the largest possible area compatible with the potential of the current used. That is to say, the inner foil 11 is extended as near the edge of crystal 10 as can be safely done without permitting its charge to arc across the space between its periphery and the periphery of the crystal. As already explained, the glow takes the course indicated by the arrows in Fig. 2, while the di-electric cement 17 and 18 eliminates the edge discharge factor, and these conditions, together with the fact that the field of electrification is on a relatively smooth surface, constitute the ideal state for generating ozone with the complete absence of undesirable oxides.

Figure 2:
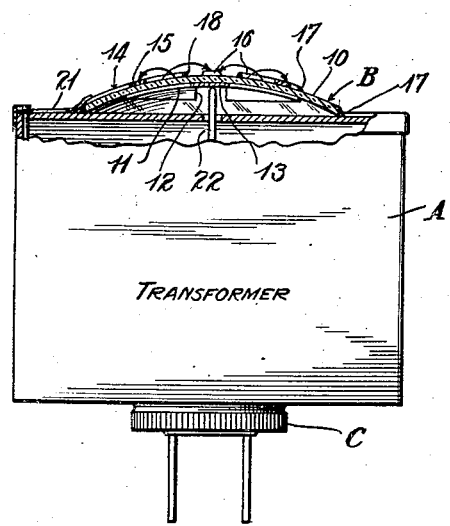
Figure 2 is a side view partly in section of the ozonizing device.
Figure 3:
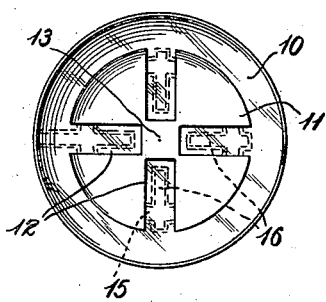
Figure 3 is a plan view of the inner surface of the ozonizing element, this view showing the ozonizing element of Fig. 1 in inverted position.
Figure 4:
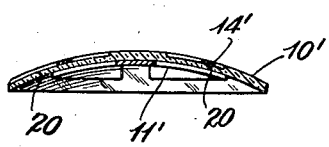
Figure 4 is a sectional view of a modified construction of ozonizing element.

In Fig. 4, I have shown a modified form of my ozonizing element which is characterized by a still smoother outer surface than that provided by the construction of Figs. 1 and 2. In this modification of the invention, the di-electric plate 10' is provided with an inner surface electrode 11', as in the construction previously described. However, instead of cementing the outer electrode to the upper face of the crystal, the latter is etched with hydro-fluoric acid to provide recesses for reception of an outer electrode 14' of substantially the same configuration as shown in Fig. 1. In this way, it is possible to position the exposed surface of the outer electrode in the same plane as the outside surface of the glass plate, thus enhancing the smoothness of the ozonizing surface. In this modification it is not necessary to cover the edges of the electrode with di-electric cement, but I prefer to di-electrically cement the electrode into the etched recesses to insure its retention and the elimination of edge discharge.

Referring now to the transformer casing A, it contains a suitable transformer of any known construction for converting the electricity of the ordinary household circuit to the voltage requisite for the operation of the ozonizer, and for limiting the amperage to meet the same requirements. Since such a transformer, per se, forms no part of the present invention, and as it is well known, I have not illustrated the same in the drawing. In a specific construction I have employed a transformer comprising primary and secondary windings so disposed within a laminated magnetic field as to yield an output of 6000 volts by .8 milli-amperes. The primary winding has 500 turns of No. 38 wire, and the secondary winding 30,000 turns of No. 40 wire. The core was T-shaped and its dimensions were 1 inch, 1⅛ inches, and 1¾ inches. The winding length was 1½ inches. The consumption of this device is between 5 and 6 watts and by the use of finer wires, it is possible to reduce the size of the transformer and also the current consumption. It is desirable to make the complete device as small as possible, and I have constructed a complete ozonizing unit which is not substantially larger than an ordinary electric light bulb.

The ozonizing element B is secured to one side of casing A as by cementing, and the outer surface thereof exposed to the open air. The outer electrode 14 is grounded to the primary circuit of the transformer through the contact member 21, which projects into the transformer casing as best shown in Fig. 2. The terminal 22 of the secondary winding projects through the top of the casing and is held in contacting engagement with central section 13 of inner electrode 11. It will thus be seen that the inner electrode is insulated from the outside, and, the exposed electrode of the ozonizing device being grounded to the primary circuit, the whole device can be handled without danger of a shock or short circuiting. Also the ozonizing circuit may be readily wiped clean with a rag, but this rarely becomes necessary since I have observed that the electrified particles of dust form and collect in a ring outside the zone of electrification. An outside connection for the transformer is provided by the plug C whereby the complete ozonizing unit can be fitted into an electric socket or the ordinary household circuit.

The complete device is preferably located in the ceiling or high in the room, and when contact is made with the source of electricity by closing the conventional switch, the discharge of ozone will instantly proceed, and will be found to diffuse itself quite uniformly throughout the room. In the same manner, the device may be inserted in the top of the food compartment of a refrigerator, whereby the ozone created, through its bactericidal and deodorant characteristics, will preserve the food much longer than usual and prevent one class of food from tainting another.

If it is desired to use the ozonizing element in the air intake of an automobile, it is not necessary to employ the transformer, but the high tension current supplied to the ignition system may be made to serve. This is accomplished by fitting the ozonizing element in the carburetor or in the intake manifold in any position in which the incoming air or the air-gasoline mixture will come in contact with it, connecting the central electrode to one high tension terminal, usually ground, and the other, through an insulated wire to the top of one of the spark plugs or to the distributor.

By way of comparison of the efficiency of the present invention with that of the Siemens tube, it may be stated that the amount of ozone created in a measured quantity of air in a given time by the same amount of electrical current is more than 10 times when the present invention is used than when the Siemens tube is used; and, further, the air treated by the Siemens tube shows evidence of acid, whereas the air treated by my device shows no traces thereof.

From the foregoing, it will be seen that I have devised an improved construction of ozonizer having the advantages herein set forth. Many variations obvious to one skilled in the art may be made in the device herein chosen for illustration without departing from the scope of the invention. For example, the di-electric plate, instead of being curved as herein shown, may well be a flat or plane surface, a watch crystal having been employed in the illustrated modifications only as a matter of convenience.

Having thus described the invention, I claim:

1. An air activating element comprising a di-electric plate and surface conductors secured to the opposite faces of the plate, one of which conductors presents only a substantially unilateral exposure to the gas to be treated.

2. An air activating element comprising a di-electric plate and surface conductors secured to the opposite faces of the plate, all faces but one of one of said conductors being covered with di-electric material.

3. An air activating element comprising a di-electric plate, surface electrodes on opposite sides of the plate, and means for causing electrical discharge through the gas being treated to take place from a surface of one of the electrodes to only the outer surface of the other electrode.

4. In an activator having parallel electrodes of substantial surface area, the combination of means for effecting electrical discharge through the gas being treated from a surface of one of the electrodes to only the remote surface of the other electrode, said other electrode being exposed to gas being treated.

5. An air activating element comprising a smooth di-electric member and smooth electrodes of substantial surface area cemented to opposite sides of said member, one or more sides of one of said electrodes being coated with di-electric cement and a substantial portion of the other electrode being out of alignment with said one electrode.

6. An air activating element comprising a glass plate having a metal foil electrode cemented to one side thereof, a recess provided in the opposite side of the plate, and a second electrode positioned in said recess and exposed to the gas being treated.

7. An air activating element comprising a di-electric plate, a surface conductor secured to one face of the plate, and a second surface conductor on the opposite face of the plate, the exposed surface of said second conductor and of said plate lying in substantially the same plane, said second conductor having at least some portions thereof in non-overlapping relation with the first conductor and laterally spaced therefrom.

8. An activator of the electric-discharge type, having electrodes in which the gas to be activated is in contact with only a single outer surface of one electrode.

9. An activator of the electrical-discharge type which presents only a unilateral surface contact to the gas being activated.

10. An activator of the electrical-discharge type in which said discharge is projected from only a unilateral surface into the gas being activated.

11. A compact air activating unit comprising a transformer, a casing therefor, an ozonizing element mounted on a wall thereof, electrical connections from said transformer to said ozonizing element, a connector provided on another wall of said casing, said connector adapted to be detachably secured to an electrical fixture to support said ozonizing unit, said ozonizing element being of the electrical discharge type and presenting only a unilateral surface contact to the gas being ozonized.

12. An air activating element comprising a di-electric plate, a surface electrode secured to one face of the plate, and a second surface electrode secured to the opposite face of the plate, one of said electrodes being exposed to the gas to be treated, said exposed electrode having at least some portions out of alignment with portions of the first electrode, said portions of the exposed electrode being laterally spaced from an edge of the first electrode.

13. An air activating element comprising a relatively smooth surfaced di-electric plate and surface conductors secured to opposite faces of the plate, said conductors being adapted to have an electric discharge formed therebetween, one of said electrodes being exposed to the gas being treated, a portion of said discharge passing through the di-electric member and the gas being treated, to said exposed electrode, said exposed electrode and said plate being formed to provide a surface free from gas retaining pockets in the treating zone of the discharge whereby the discharge is effective to expel treated gas from the treating zone to prevent substantial retreatment of the gas.

ROBERT JOHN.